(No Model.)
J. MILLS.
SPROCKET FOR ROPE AND SIMILAR BELTS.
No. 276,619. Patented May 1, 1883.
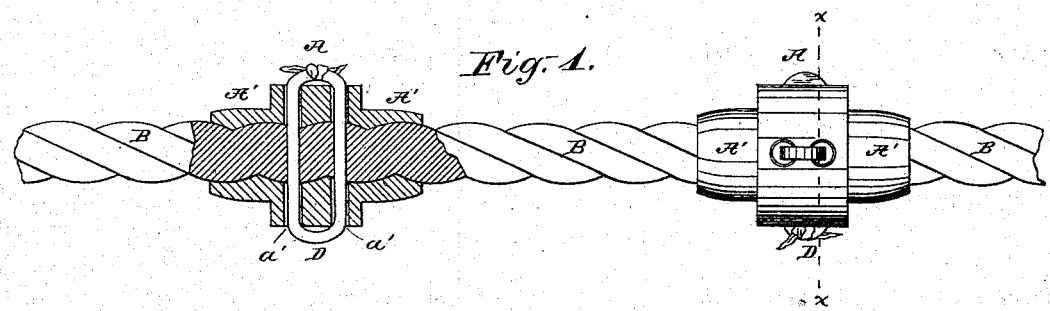
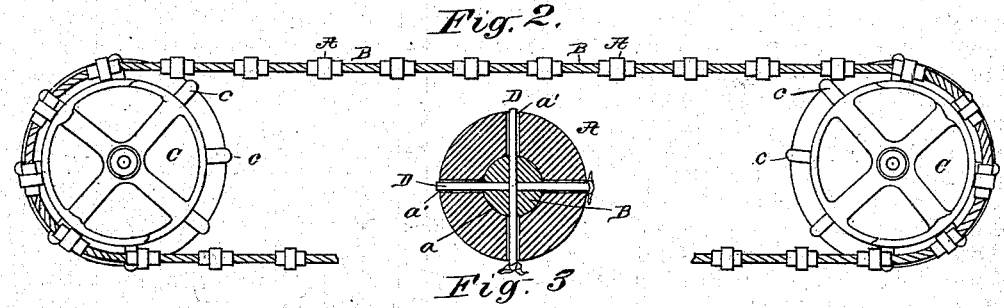
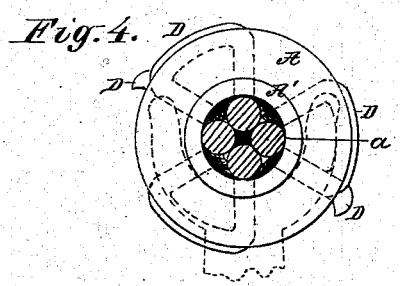 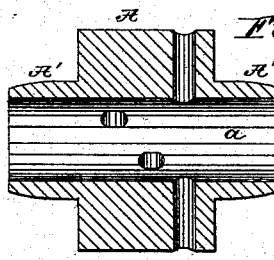
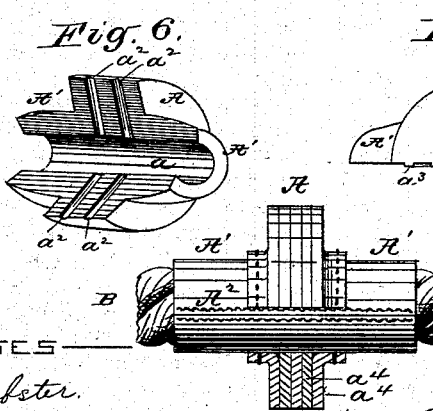 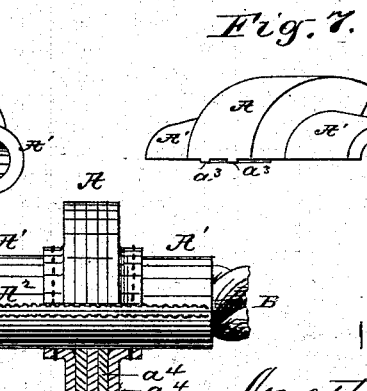
WITNESSES
M. E. Webster.
F. W. Kauhagen.
INVENTOR
Jonathan Mills
per M. E. Dunston
Attorney

UNITED STATES PATENT OFFICE.

JONATHAN MILLS, OF CHICAGO, ILLINOIS.

SPROCKET FOR ROPE AND SIMILAR BELTS.

SPECIFICATION forming part of Letters Patent No. 276,619, dated May 1, 1883.

Application filed July 1, 1882. (No model.)

*To all whom it may concern:*

Be it known that I, JONATHAN MILLS, of Chicago, in the county of Cook and State of Illinois, have invented certain new and useful Improvements in Sprockets for Rope and Similar Belts; and I do hereby declare that the following is a full, clear, and exact description thereof, reference being had to the accompanying drawings, and to the letters of reference marked thereon, which form a part of this specification.

This invention has reference, mainly, to rope belts or other belts of similar cylindric form, and relates to novel features in the construction and in the application of sprockets to this form of belts for transmitting power, and similar purposes.

One object of my invention is to provide a sprocket constructed in a single piece and adapted to be securely attached to a rope or other cylindric belt. Another object is to produce a safe and noiseless sprocket which will allow the belt to be driven at any desired speed.

Heretofore sprockets designed to be attached to ropes or similar cylindric articles when used as belts have been made of metal and in two or more parts clamped or bolted to the rope or belt. A serious objection to a metal sprocket, in case it is necessary to run the same at a high speed or under heavy work, is that the sprockets by their violent contact with the metal parts of the sprocket-wheels make a great noise, and are liable also to emit sparks, which are extremely dangerous. Another objection to metal sprockets applied to ropes, leather, or similar belts is that by reason of their rigidity they tend to break the belt by flexure of the latter back and forth in passing on and off the pulleys. To remedy these faults I propose to make the sprockets of rubber having such a pliable consistency that they may be bound, compressed, or otherwise secured upon the rope or belt with necessary firmness, but which will by their yielding nature occasion no noise by contact with the sprocket-wheels, and which will of course operate without the emission of sparks and the danger thereby produced. At the same time the rubber sprockets will be given sufficient rigidity to retain their form and do the work required of them. Sprockets made of rubber will also, by reason of their flexibility, prevent the sharp bend in the belt as the same passes upon and leaves the pulley, and will therefore not operate to break or cut the rope, as is the case with metal sprockets heretofore employed. The sprockets will usually be made in a single piece, provided with a central cylindric aperture fitted to the size of the rope or belt, and also with radial holes, through which and through the rope a thong may be passed for the purpose of securing it in place. The sprocket may, however, be cemented upon the rope or held by rims or by other form of bands or clamps embracing them and compressing them firmly upon the belt. The sprocket may also be made in parts, longitudinally divided and secured by the same means.

In the drawings, Figure 1 illustrates a section of a twisted hemp rope, showing my improved sprockets thereto applied, one of which sprockets and that portion of the rope included within the same being shown in a section taken through the axis of the rope. Fig. 2 is an elevation and partial section of a pair of sprocket-wheels, together with a rope provided with my improved sprockets applied thereto. Fig. 3 is a transverse section of the sprocket and rope through *x x* of Fig. 1. Fig. 4 is an end elevation of a rubber sprocket applied to a rope, and illustrating by dotted lines a special mode of attaching the sprocket to the rope by means of a thong passing through the rope and sprocket. Fig. 5 is a section taken longitudinally of the axis of the sprocket shown in Fig. 4, and showing the position of the apertures through the same for the insertion of the thong. Fig. 6 shows a sprocket constructed in parts. Fig. 7 shows a section of the sprocket, and Fig. 8 shows a sprocket composed of leather disks.

A A represent rubber sprockets, and B a rope or other cylindric form of flexible belt to which the sprockets are applied. C C are sprocket-wheels of the usual or any desired or suitable construction. The sprockets A consist of pieces of rubber, usually cylindrical in form and of any desired diameter, cast with a central axial aperture of proper size to admit closely the rope to which they are to be applied. On opposite faces of the sprockets are central annular flanges, A', surrounding the rope and of sufficient length to extend through the fingers *c* of the sprocket-wheel, being intended to drop between said fingers, and thereby prevent the rope itself from being chafed or worn, as would be the case were the latter brought directly into contact with the fingers.

The above-described sprocket is preferably made of moderately soft vulcanized rubber, cast to form with the flanges A' continuous with the central portion A, and having a central axial aperture, a.

As a desirable means for attaching the sprockets thus connected to a rope I have illustrated the use of a thong, D, which passes through transverse apertures a', cast in the sprocket for this purpose, and which may be tied externally to the sprocket, as illustrated in Fig. 1, or be held sufficiently bound therein by passing the two ends of the thong through the same one of the several apertures, as indicated in Fig. 4. I do not wish, however, to be limited in this mode or means of securing the sprockets to the belt, inasmuch as external clamps may be employed to compress the central body of the sprocket or its flanges A' about the rope or belt to which the sprocket is applied.

While I prefer generally to make the sprocket in a single piece with the central axial aperture a, as described, said sprocket may be made in two or more parts, divided longitudinally or through the plane of its axis, and the parts held together and upon the rope or belt by means of external clamps or binding devices.

It is obvious that a rope or similar belt provided with rubber sprockets may be run at any desired speed without noise and without the special peril from fire that accompanies the use of metal sprockets and sprocket-chains.

It is further obvious that the flexibility of the moderately soft rubber sprockets described is such as to avoid the production of sharp angles in the rope when the latter passes on and off the belt, and that therefore said rope will not be cut or broken at its point of juncture with the sprockets. It may be additionally remarked that there will also be no injurious chafing of the rope on the inner surface or at the edges of the sprockets.

Though I prefer to make the sprockets in a single piece, as already stated, I propose notwithstanding to provide sprockets made in parts more especially to be applied to the belt in place of those that may be injured or destroyed by use without the necessity of removing the others or of cutting and splicing the rope. When the sprockets are made in parts, however, their faces may be constructed with corresponding offsets or projections and recesses, $a''$ $a'''$, as illustrated in Fig. 6, so that one part shall interlock with the other in a familiar manner, in order that one may not slip upon the other. When the sprockets are made in parts, I prefer that such parts shall meet in planes passing through the axis at an angle, say, of about one hundred and twenty degrees, making one part two-thirds and the other one-third of the sprocket, as also illustrated in Fig. 6; but they may, if preferred, be made in halves or in parts bearing other relative proportion to each other.

Thus far in describing my invention I have spoken only of rubber as the material of which the sprockets are made. Certain purposes of said invention may, however, be well accomplished by the use of leather instead of rubber, and in Fig. 8 I have illustrated in side elevation a sprocket made of leather. The flanges A' are, as here shown, continuous with each other, being the ends of a central cylinder, A'', which embraces the rope or belt, and formed of one or more thicknesses of heavy leather, bent to shape and secured in any suitable manner. The sprocket proper, A, is shown as being composed of several disks of leather, $a''''$, centrally surrounding the cylinder A'', and firmly fastened thereto by cement, rivets, stitching, or otherwise. If desired, a metal flange may be secured to the cylinder A'' in place of the central leather disks, $a''''$, shown, and faced on one or both sides by a disk or disks of leather. The outer leather disks are shown as having short flanges turned outward about the cylinder A'' as a means of fastening the parts together, either by rivets or stitching or cement. The sprocket of leather may, as a whole, be secured to the belt by either of the means above described for fastening the rubber ones.

I claim as my invention—

1. A continuous flexible rope or belt, in combination with flexible sprockets arranged at equal intervals and separately secured upon the belt, substantially as described.

2. In combination with a sprocket-wheel, a rope or other belt provided with separated and separately-secured sprockets, each having one or more flexible elongations surrounding the belt adjacent to the sprocket and in position to bear on the wheel projections, substantially as described.

3. In combination with a rope or other belt, a series of separated sprockets, each separately secured by a thong passing through the sprocket and belt, substantially as described.

In testimony that I claim the foregoing as my invention I affix my signature in presence of two witnesses.

JONATHAN MILLS.

Witnesses:
M. E. DAYTON,
JESSE COX, Jr.